United States Patent [19]
Haslbeck et al.

[11] Patent Number: 6,113,870
[45] Date of Patent: *Sep. 5, 2000

[54] CLOSED LOOP NO$_x$ REDUCTION

[75] Inventors: John Leo Haslbeck; Warren Tzu Ma, both of Pittsburgh; James Brown Black, III, Elizabeth, all of Pa.

[73] Assignee: Noxso Corporation, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/560,075

[22] Filed: Nov. 17, 1995

[51] Int. Cl.$^7$ .................................................. B01D 53/56
[52] U.S. Cl. ........................................................ 423/239.1
[58] Field of Search ..................... 423/393, 396, 423/395, 235, 239.1

[56]       References Cited
       U.S. PATENT DOCUMENTS 4,367,204   1/1983   Klopp et al. ..................... 423/239.1
4,755,499   7/1988   Neal .
4,798,711   1/1989   Neal ..................................... 423/239.1

OTHER PUBLICATIONS

Olsen, John *Unit Processes & Principles of Chemical Eng.* p. 1–3, Jul. 1932.

Felder et al. *Elementary Principles of Chemical Processes* p. 106, 1978.

*Primary Examiner*—Tom Dunn
*Attorney, Agent, or Firm*—Doepken Keevican & Weiss

[57]   ABSTRACT

Process and apparatus which increase the concentration of NO$_x$ in an off-gas stream of heated air carrying NO$_x$ removed or desorbed from sorbent, feed the off-gas stream into NO$_x$ reduction apparatus, or to nitrogen by-product producing apparatus, and maintain the volume of the off-gas stream substantially constant as the NO$_x$ concentration is being increased.

16 Claims, 5 Drawing Sheets

CLOSED LOOP $NO_x$ REDUCTION

BACKGROUND OF THE INVENTION

Generally, this invention relates to improved process and apparatus which utilize a sorbent, or sorbent particles, for removing at least $NO_x$, nitrogen oxides (NO, $NO_2$, and $N_2O_4$), from gas.

More particularly, this invention is an improvement in the process and apparatus disclosed in U.S. Pat. No. 4,798,711 entitled PROCESSES FOR REMOVING NITROGEN OXIDES, SULFUR OXIDES AND HYDROGEN SULFIDE FROM GAS STREAMS, issued Jan. 17, 1989, Lewis G. Neal, et al. inventors, and assigned to NOXSO Corporation, the same assignee as the present invention; this patent is hereby incorporated herein by reference, and this prior art process is referred to in the art and hereinafter and in the appended claims as the NOXSO Process. The NOXSO Process is illustrated in FIG. 3 of the 4,798,711 patent and, for convenience of reference, FIG. 3 of this patent is reproduced in the present drawings as FIG. 1. Referring to such FIG. 1, there is shown a flue gas stream 12 containing both $NO_x$ and $SO_x$, sulfur oxides ($SO_2$ and $SO_3$) from, for example, a coal-fired or oil-fired power plant (not shown) which flue gas stream 12 is passed through a fluid bed adsorber 14 containing suitable sorbent particles or beads, such as, for example, the alkali-impregnated alumina sorbent particles disclosed in U.S. Pat. No. 4,755,499 entitled SORBENT FOR REMOVING NITROGEN OXIDES, SULFUR OXIDES AND HYDROGEN SULFIDE FROM GAS STREAMS, issued Jul. 5, 1988, Lewis G. Neal, et al., inventors, and assigned to NOXSO Corporation, the same assignee as the present invention; this patent is also incorporated herein by reference and these sorbent particles are referred to in the art and hereinafter and in the appended claims as the NOXSO Sorbent or the NOXSO Sorbent Particles. Adsorber 14 has a fluidizing grid 15 for fluidizing the NOXSO Sorbent. The $SO_x$ and $NO_x$ are adsorbed on the surfaces of the NOXSO Sorbent, contained in the fluid bed adsorber 14, and thereby removed from the flue gas stream 12 which is discharged to the atmosphere from the adsorber 14 via line 70.

The loaded or saturated NOXSO Sorbent, i.e. the NOXSO Sorbent having adsorbed the $NO_x$ and $SO_x$ from the flue gas, is subsequently transported to a staged, fluid bed heater 18 wherein the temperature of the NOXSO Sorbent is raised above 532° C. (1000° F.) using a stream of hot air 20 supplied by hot air heater 22 into which air heater a stream of ambient or combustion air 24 and a suitable fuel or fuel stream 26, e.g., natural gas, enter; the hot air heater 22 also produces combustion products which enter the hot air stream 20. As the temperature of the NOXSO Sorbent rises in the fluid bed heater 18 and passes through about 350° C., the $NO_x$ that was adsorbed by the loaded NOXSO Sorbent is removed or stripped from the NOXSO Sorbent, mixes with the hot air stream 20 flowing through the fluid bed heater 18 and is carried away in an off-gas stream having a temperature of about 165° C.; the off-gas stream 30 passes through cyclone 28 and is transported to and mixed with the power plant (such as the oil-fired or coal-fired power plant noted above) combustion air stream (not shown) where the $NO_x$ is destroyed in the power plant combuster.

The hot NOXSO Sorbent with the $NO_x$ removed therefrom, but with the $SO_x$ still adsorbed thereon, is transferred from the sorbent heater 18 into a moving bed regenerator 32 via line 34. In the moving bed regenerator 32, the NOXSO Sorbent is contacted with a suitable regenerant gas stream 36. The regenerant gas 36 reacts with the $SO_x$ adsorbed by the NOXSO Sorbent, removes or desorbs the $SO_x$ from the NOXSO sorbent, and produces elemental sulfur. Off-gas stream 38 containing elemental sulfur is transported into a sulfur condenser and mist eliminator 45 wherein a steam stream 42, water stream 44 and elemental sulfur stream 46 are produced. A stream 40 from the sulfur condenser and mist eliminator 45 is returned to regenerator 32.

The regenerated NOXSO Sorbent, or NOXSO Sorbent Particles, i.e. NOXSO Sorbent with the $SO_x$ and $NO_x$ removed, is transported via stream 48 past valve 50 to a staged, fluid bed sorbent cooler 52, where the NOXSO Sorbent is contacted with atmospheric air supplied via line 54 to reduce the temperature of the NOXSO Sorbent to about 120° C. (250° F.). The heated atmospheric air 56, having passed through the sorbent cooler 52 and having its temperature raised to about 450° C. due to its heat exchange with the heated NOXSO Sorbent in the sorbent cooler 52, is transported to gas heater 22 where the temperature of the hot air stream 56 is increased by the hot air heater 22 and used to supply, at least in part, the hot air 20 supplied to the fluid bed heater 18 to remove the $NO_x$ from the NOXSO Sorbent as described above; it will be noted that the temperature of the hot air stream 56 leaving the sorbent cooler 52 (about 450° C.) is higher than the air temperature of the hot air stream leaving the fluid bed heater 18 (about 165° C.) and carrying away the removed $NO_x$.

Cooled regenerated NOXSO Sorbent is transported via line 58 by air from line 54 to a pneumatic lift line 60 which lifts the NOXSO Sorbent into a cyclone separator 62 via stream 64. Cyclone separator 62 separates stream 64 into a stream of air 66 and a stream of regenerated NOXSO Sorbent or NOXSO Sorbent particles 68. Regenerated NOXSO Sorbent 68 enters the fluid bed adsorber 14.

In brief summary, it will be understood that in the NOXSO Process, as taught in the 4,798,711 patent, $NO_x$ and $SO_x$ are removed from the flue gas stream 12 by the NOXSO Sorbent in the fluid bed adsorber 14 to produce a stream of $NO_x$ and $SO_x$ substantially free flue gas 70 and thereafter the fluid bed heater 18, moving bed regenerator 32 and fluid bed sorbent cooler 52 regenerate the NOXSO Sorbent particles which adsorbed the $SO_x$ and $NO_x$ in the fluid bed adsorber 14 whereafter the regenerated NOXSO Sorbent Particles are transported via line 58 to the pneumatic lift line 60 for return through the cyclone separator 62 to the fluid bed adsorber 14 whereafter the NOXSO Process is repeated.

While the NOXSO Process has been proven to be successful in removing $NO_x$ and $SO_x$ from gas, e.g. flue gas, there are several disadvantages to the destruction of the $NO_x$ in the boiler of the power plant producing the flue gas, namely:

(i) the $NO_x$ destruction efficiency is specific to the individual boiler making it necessary to generate a large data base of $NO_x$ destruction data for the successful practice of the NOXSO Process in different boilers;

(ii) in multi-boiler applications, operating flexibility is reduced by requiring that the $NO_x$ recycle stream be returned to an operating boiler with adequate capacity to accept the $NO_x$ recycle stream into the combustion air system of the boiler;

(iii) inclusion of the $NO_x$ recycle stream in the combustion air of the power plant boiler requires careful integration of the NOXSO Process with the power plant to assure that neither has an adverse effect on the operation of the other;

(iv) net $NO_x$ removal efficiency of the NOXSO Process is significantly influenced by the $NO_x$ destruction efficiency of a specific boiler; modifications to the boiler to increase $NO_x$ destruction efficiency typically meet with resistance from the boiler operator;

(v) the concentration of $NO_x$ in the off-gas stream from the fluid bed heater 18 is so low or small that it is relatively technically inefficient and commercially infeasible to feed such off-gas stream carrying the removed $NO_x$ directly into $NO_x$ reduction or destruction apparatus such as $NO_x$ reducing burners, SCR (Selective Catalytic Reduction Apparatus), SNCR (Selective Non-Catalytic Reduction Apparatus) and the like known for reducing or destroying $NO_x$, or to feed such off-gas stream carrying the removed $NO_x$ directly into a device or apparatus which produces or generates from the removed $NO_x$ a marketable nitrogen by-product, e.g. nitric acid, calcium nitrate or ammonium nitrate.

Accordingly, it has been found that there is need for an improved process and apparatus generally, and in particular a need for an improved NOXSO Process and improved apparatus for practicing the NOXSO Process, for removing at least $NO_x$ from a gas, such as flue gas, wherein the $NO_x$ destruction, or reduction, does not experience the above-noted disadvantages of destroying or reducing the $NO_x$ in the boiler of a power plant and wherein the concentration of $NO_x$ in an off-gas stream carrying $NO_x$ removed from sorbent such as the NOXSO Sorbent is sufficiently high that it is technically efficient and economically feasible to feed the $NO_x$ off-gas stream directly into $NO_x$ destruction or reduction apparatus such as the above-noted $NO_x$ reducing burner, SCR, SNCR and the like, or into a device or apparatus which generates a marketable nitrogen by-product from the removed $NO_x$.

SUMMARY OF THE INVENTION

It is an object of the present invention to satisfy the above-noted needs in the art.

Process and apparatus satisfying such needs and embodying the present invention increase the concentration of $NO_x$ in an off-gas stream of heated air carrying $NO_x$ removed or desorbed from sorbent, feed the off-gas stream into $NO_x$ reduction apparatus or nitrogen by-product recovery apparatus, and maintain the volume of the off-gas stream substantially constant as the $NO_x$ concentration is being increased.

DESCRIPTION OF THE PREFERRED EMBODIMENTS

Figure 1:
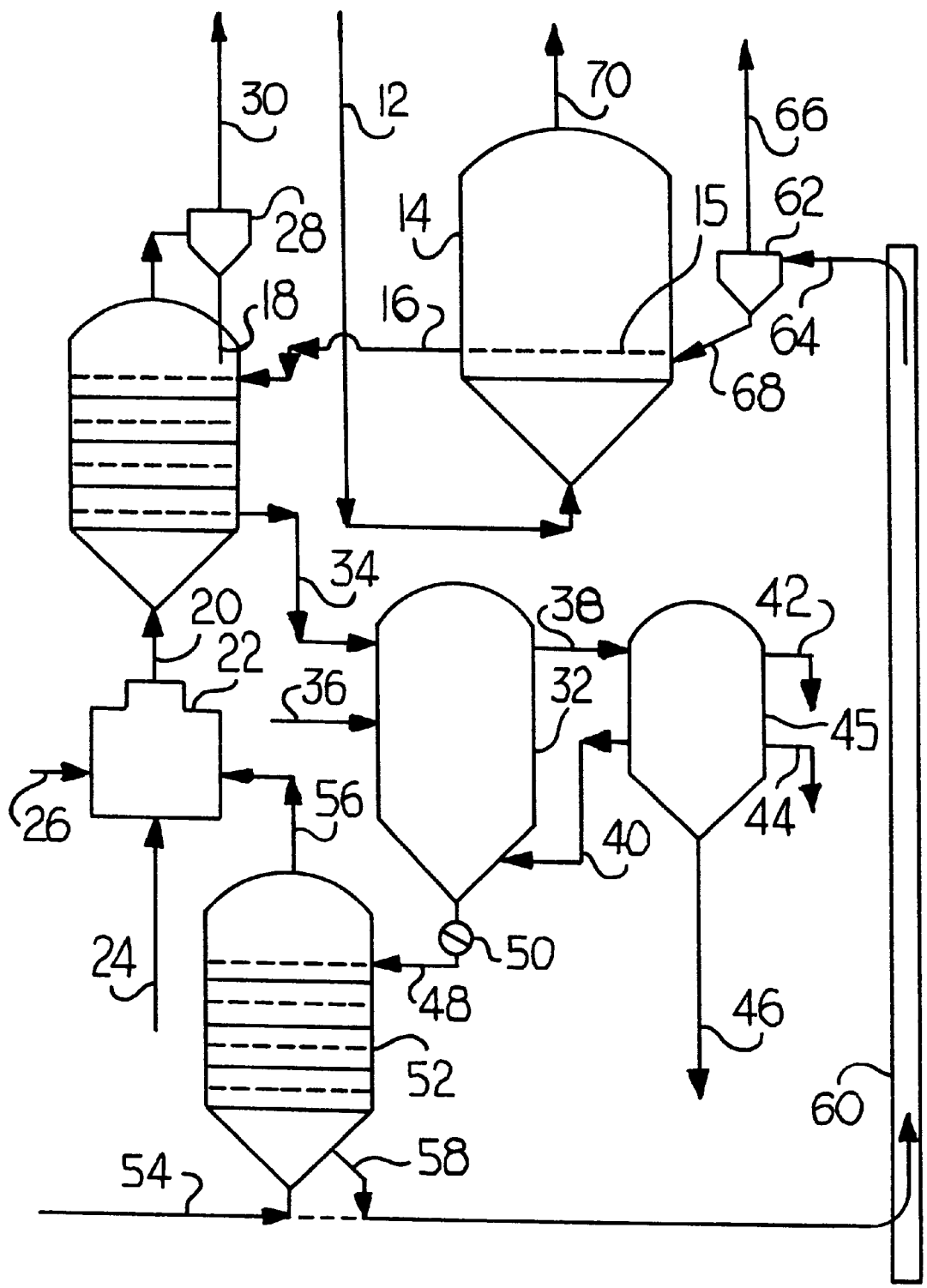
FIG. 1 is an illustration of the NOXSO Process and apparatus for practicing such process.
Figure 2:
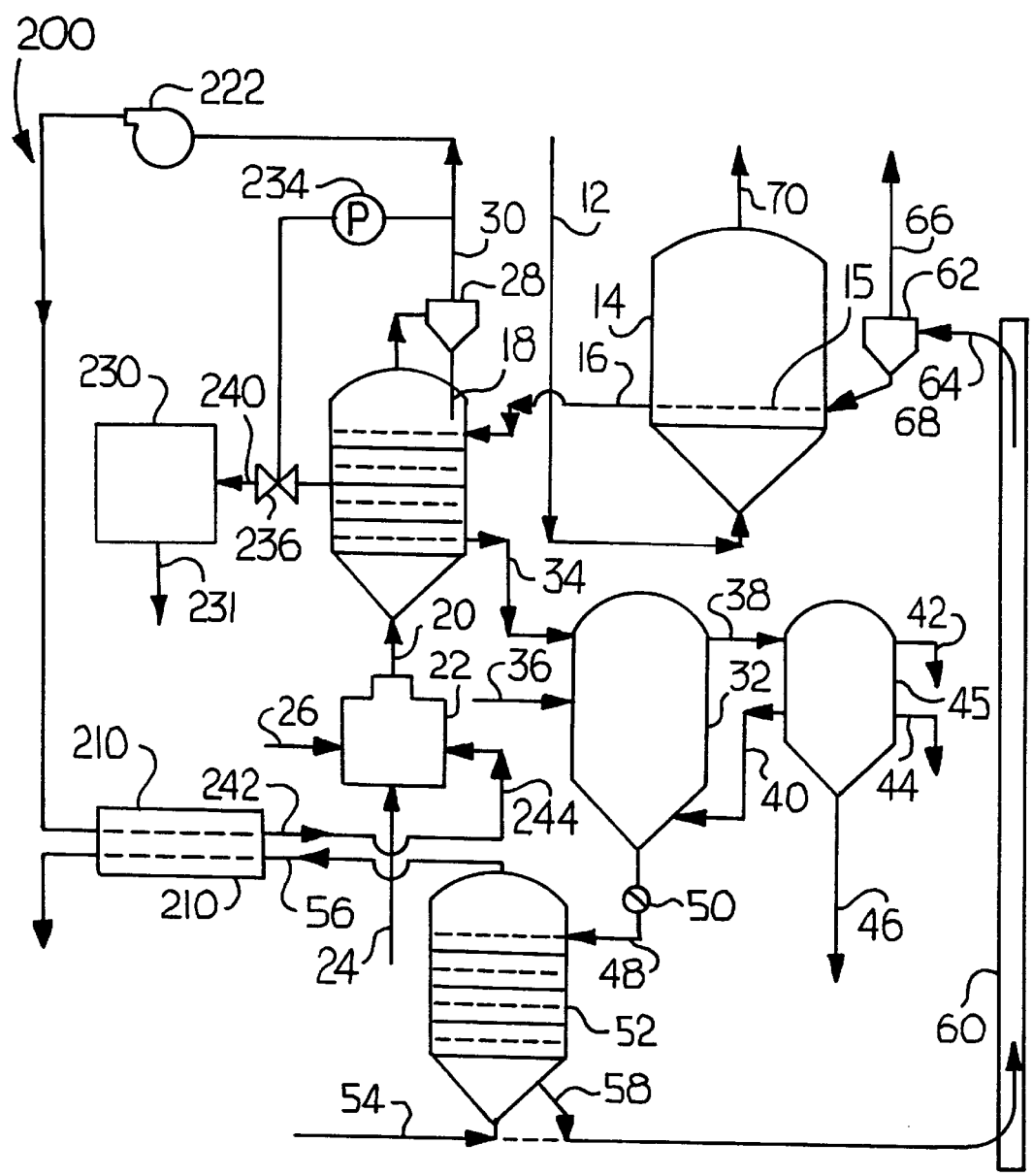
FIG. 2 is an illustration of a first embodiment of the present invention wherein the $NO_x$ reduction is decoupled from the boiler of a power plant and the concentration of $NO_x$ in the off-gas stream carrying removed or desorbed $NO_x$ is circulated around a closed loop in which additional $NO_x$ desorbed from additional sorbent is added to the circulating off-gas stream to increase the concentration of $NO_x$ in such circulating stream, wherein the removed $NO_x$ is reduced or destroyed in $NO_x$ reduction apparatus, or processed to generate a marketable nitrogen by-product, instead of a power plant boiler or combustor and wherein the volume of gas in the off-gas stream is maintained substantially constant.
Figure 3:
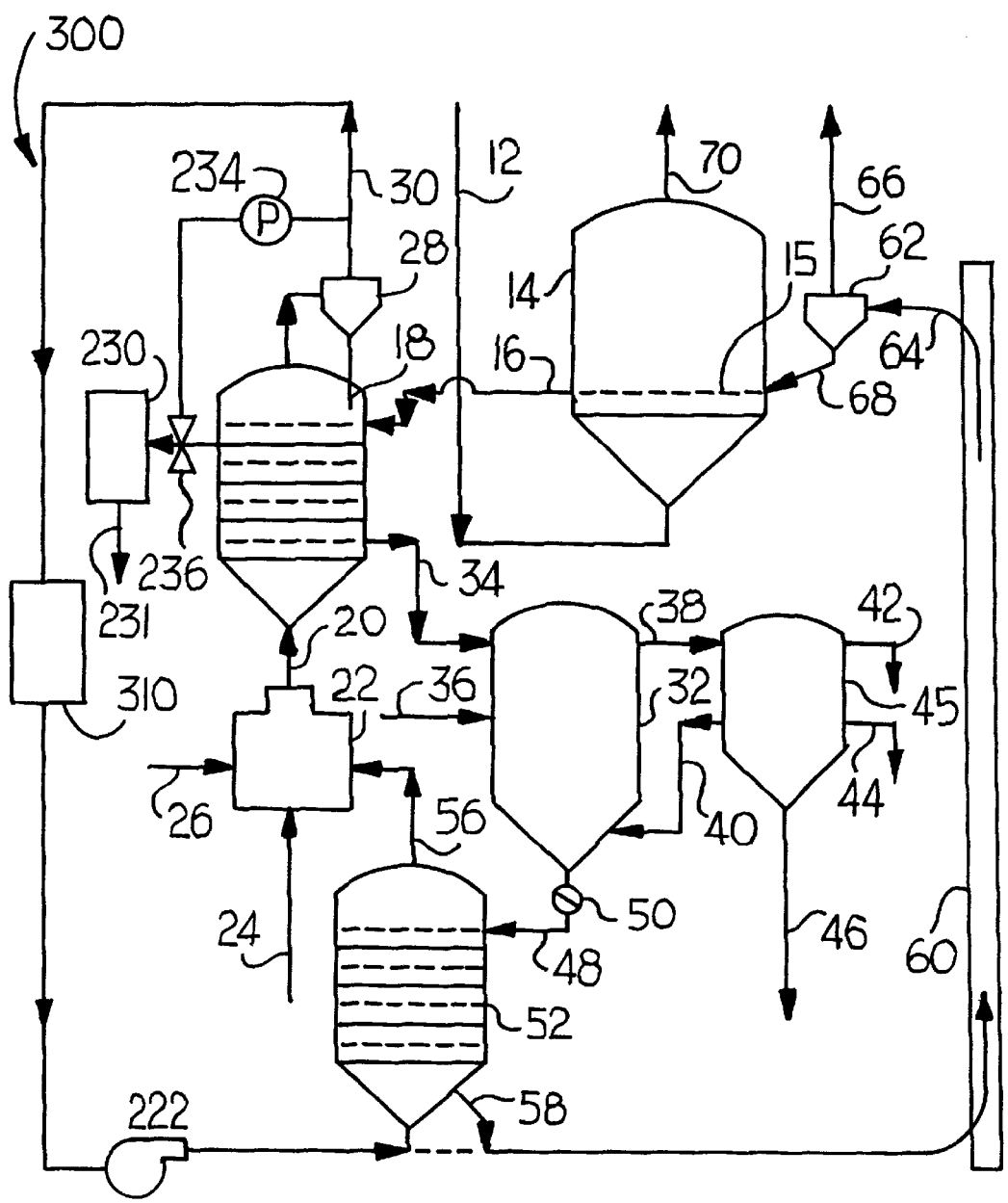
FIGS. 3 and 4 are alternate embodiments of the present invention having the same general features of the embodiment shown in FIG. 2 but wherein the circulating gas stream of off-gas carrying removed $NO_x$ is circulated around different closed loops to that of the embodiment shown in FIG. 2.
Figure 4:
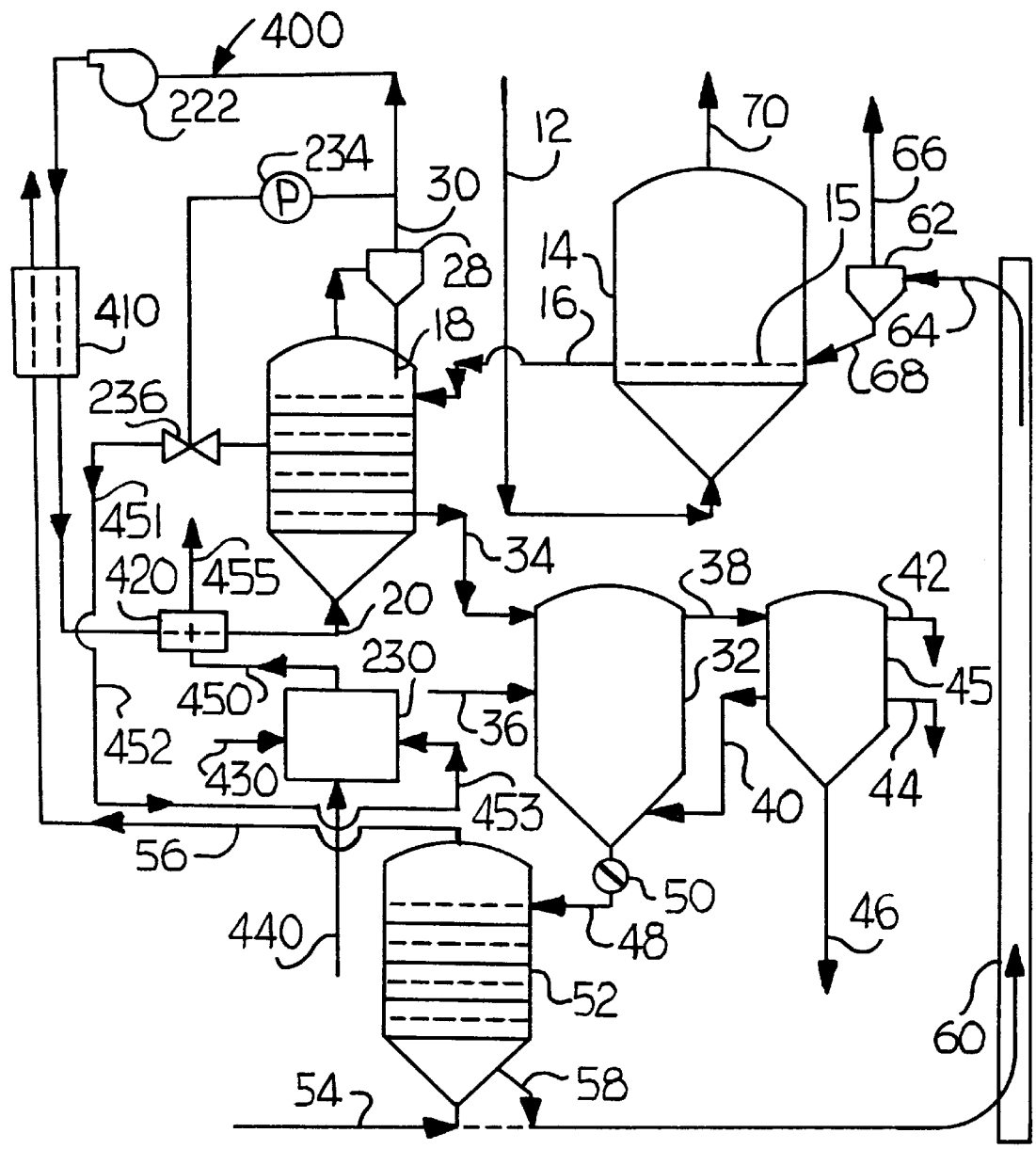

Referring generally to FIGS. 2–4, it will be understood that elements shown in these FIGS. which are the same as the elements shown in FIG. 1 are given the same numerical designations and perform the same functions and, accordingly, their description will not be repeated. Further, it will be understood that the present invention will be described, by way of example and by way of a specific embodiments, as an improvement in the NOXSO Process and improved apparatus for practicing the NOXSO Process.

Referring to FIG. 2, and the first embodiment of the present invention, the off-gas stream 30 of hot air carrying $NO_x$ removed or desorbed from the NOXSO Sorbent in the fluid bed heater 18 is circulated around a closed loop indicated by general numerical designation 200. Closed loop 200 includes the fluid bed heater 18, a gas-to-gas heat exchanger 210 and the hot air heater 22. The gas-to-gas heat exchanger 210 may be any suitable gas-to-gas heat exchanger known to the art and, if required or desired, a suitable fan 222 may be included in the closed loop 200 to assist or facilitate circulation around the closed loop 200 of the off-gas stream of heated air carrying the $NO_x$ removed from the NOXSO Sorbent. Suitable $NO_x$ destruction and reduction apparatus 230 are provided and may be of the type noted above, namely, a $NO_x$ reducing burner, SCR, SNCR and the like or alternately apparatus 230 may be nitrogen by-product recovery apparatus producing a marketable nitrogen by-product of the types noted above. Suitable pressure measuring apparatus 234, of the type known to the art, is provided to measure the pressure in the off-gas stream of hot or heated air carrying the removed or desorbed $NO_x$ and which off-gas stream is circulating around the loop 200. A suitable valve 236, of the type known to the art, is connected intermediate the fluid bed heater 18 and the $NO_x$ reduction apparatus 230 or nitrogen by-product recovery apparatus as noted above. The valve 236 is connected to and under the control of the gas pressure measuring apparatus 234. It will be understood that the pressure measuring apparatus 234 is of the type known to the art which, in addition to measuring pressure in the off-gas stream 30 as noted above, also provides a signal to open and close the valve 236 in response to pressure measured by the apparatus 234.

It will be understood that as the off-gas stream 30 of heated air carrying the $NO_x$ removed from the NOXSO Sorbent is circulated around the closed loop 200 additional $NO_x$ sorbent loaded or saturated with adsorbed $NO_x$ is continuously fed from the fluid bed adsorber 14 into the fluid bed heater 18 and additional $NO_x$ desorbed or removed in the fluid bed heater 18 is being added continuously to the off-gas stream of heated air 30 circulating around the loop 200 which increases the concentration of the $NO_x$ in the off-gas stream of heated air circulating around the closed loop 200; the continuous addition of the additionally removed $NO_x$ to the off-gas stream circulating around the loop 200 also increases the volume of gas in such circulating off-gas stream. Also, as the off-gas stream of heated air 30 carrying the $NO_x$ removed from the $NO_x$ sorbent is circulating around the closed loop 200, combustion products from the hot air heater 22 are being added continuously to the off-gas stream 30 and these combustion products also add continuously to the volume of off-gas stream circulating around the closed loop 200. Accordingly, since the volume of the off-gas stream carrying the removed $NO_x$ and circulating around the loop 200 is continuously being increased and since the loop 200 is closed, a volume of gas must be extracted from the loop to maintain its volume constant or at least substantially constant in the closed loop 200.

As known to those skilled in the art, as the volume of a stream of gas circulating around a closed loop increases, the pressure of the circulating gas also increases. Thus, and as further known to those skilled in the art, a measurement of the gas pressure in a gas stream circulating around a closed loop is an indication or reflection of the volume of such gas and hence a measurement of the pressure of such circulating gas is a measure of the volume of such circulating gas. Accordingly, the volume of the off-gas stream carrying the removed $NO_x$ and circulating around the closed loop 200, FIG. 2, can be measured by measuring the pressure in such gas stream. In the present invention, the gas volume of the off-gas stream 30 carrying the removed $NO_x$ and circulating around the closed loop 200 is controlled by extracting, or bleeding off from such gas stream, a volume of gas equal, or at least substantially equal, to the volume of the additional $NO_x$ added to the loop and the combustion productions from the hot air heater 22. This is achieved in the present invention by the gas pressure gauge 234 and the valve 236. A pressure range is determined empirically for the off-gas stream circulating around the loop 200 which will maintain the volume of the gas stream constant, or substantially constant, and which will result in the extracting or bleeding off of a volume of gas equal to, or at least substantially equal to, the additional $NO_x$ added to the off-gas stream and the combustion products from the hot air burner 22. For example, were it determined that the pressure in the off-gas stream 30 carrying the removed $NO_x$ and circulating around the closed loop 200 is to be maintained within 5 to 7 psi, the gas pressure measuring apparatus 234 is set to open the valve 236 upon the measured pressure of the circulating off-gas stream 30 being above 7 psi to extract or bleed off from the fluid bed heater 18 a volume of gas, as indicated by the arrow 240 in FIG. 2, and to partially close the valve 236 upon the measured pressure of the off-gas stream 30 circulating around the closed loop 200 falling below 5 psi to reduce the extracting or bleeding off of the circulating off-gas stream. The extracted or bled off volume of gas from the heated off-gas stream 30 carrying the removed $NO_x$ and circulating around the closed loop 200 is fed to the $NO_x$ reduction apparatus 230 as indicated by the arrow 240 where the $NO_x$ is destroyed or reduced to harmless $N_2$, $H_2O$ and $CO_2$ which may be discharged to the atmosphere as an off-gas as indicated by the arrow 231 in FIG. 2; alternately, apparatus 230 may be apparatus for producing or generating a nitrogen by-product from the concentrated stream of $NO_x$ 240. It will be understood that as the heated off-gas stream 30 carrying the removed $NO_x$ circulates around the loop 200, the pressure measuring apparatus 234 and the valve 236 periodically extract or bleed off a portion of such gas to maintain the volume of the circulating off-gas stream 30 constant, or at least substantially constant.

In the present invention, the amount of energy required to heat the hot air 20 supplied to the fluid bed heater 18 to remove or desorb the $NO_x$ from the saturated NOXSO Sorbent entering the fluid bed heater 18 from the fluid bed adsorber 14 is reduced by producing a heat exchange in the gas-to-gas heat exchanger 210 between the circulating off-gas stream 30, having a temperature of about 165° C. as noted above, and the off-gas stream of hot air 56, having a temperature of about 450° C. as noted above, exiting the fluid bed sorbent cooler 52. This heat exchange increases the temperature of the circulating off-gas stream 30 exiting the gas-to-gas heat exchanger 210 and this further heated off-gas stream 30, as indicated by the arrows 242 and 244 in FIG. 2, is fed into the hot air heater 22 where its temperature is further increased to supply, at least in part, the hot air 20 entering the fluid bed heater 18 to desorb the $NO_x$ from the saturated NOXSO Sorbent.

An alternate embodiment of the present invention is shown in FIG. 3. In this embodiment, the heated off-gas stream 30 carrying the removed $NO_x$ circulates around a closed loop 300 which includes the fluid bed heater 18, a suitable gas cooler 310 of the type known to the art, a fan 222 if required or desired, the fluid bed sorbent cooler 52 and the hot air heater 22. This embodiment includes the $NO_x$ reduction burner 230, pressure measuring apparatus 234 and valve 236 which function in the same manner as the correspondingly numbered elements in FIG. 2 and function in the same manner to control the gas volume of the heated off-gas stream 30 carrying the removed $NO_x$ circulating around the closed loop 300 and to reduce removed $NO_x$ in the $NO_x$ reduction burner 230; or, alternately, 230 may be a nitrogen by-product generator for generating from the removed $NO_x$ the marketable nitrogen by-products noted above. The heated stream of off-gas 30 carrying the removed $NO_x$ circulating around the loop 300 is constantly circulated through the gas cooler 310 to reduce to about 25° C. the temperature of the circulating off-gas which is fed from the output of the gas cooler 310 into the input of the fluid bed sorbent cooler 52 instead of the ambient air 54 as shown in FIG. 1.

Figure 3A:
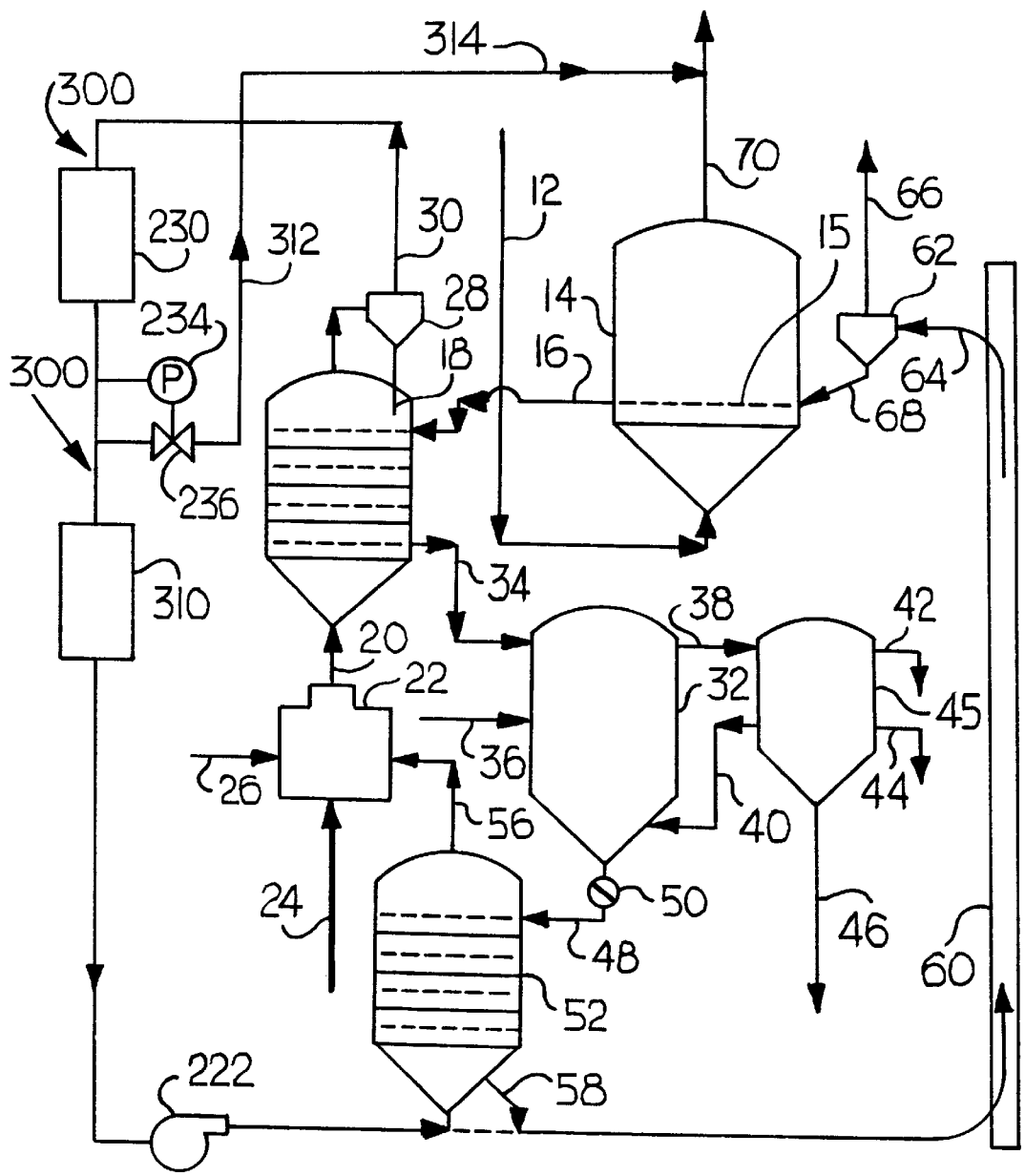
FIG. 3A is an alternative to the embodiment shown, respectively, in FIG. 3.

An alternative invention embodiment to that shown in FIG. 3 is shown in FIG. 3A. In this embodiment the $NO_x$ reduction burner 230 is disposed in the closed loop 300 and the pressure measuring apparatus 234 and valve 236 periodically extract or bleed off a volume of the circulating off-gas 30 equal to, or at least substantially equal to, the volume of additional $NO_x$ and combustion products added to the circulating stream 30 and feed such extracted or bled off gas volume, as indicated by the arrows 312 and 314, to the off-gas stream 70 which exits the fluid bed adsorber 14 and is discharged into the atmosphere.

A still further alternate embodiment of the present invention is shown in FIG. 4. In this embodiment, the heated stream of off-gas 30 carrying the removed $NO_x$ is circulated continuously around the closed loop 400 which includes the fluid bed heater 18, fan 222 if desired or required, a suitable gas-to-gas heat exchanger 410 and a suitable gas-to-gas heat exchanger 420; the gas-to-gas heat exchangers 410 and 420 may be of the type known to the art. In this embodiment, the hot air heater 22, FIGS. 1–3A, is replaced by the $NO_x$ reduction burner 230 into which is fed suitable fuel 430 (e.g. natural gas) and ambient or combustion air 440. The temperature of the circulating heated off-gas stream 30 carrying the removed $NO_x$ is increased or raised in the gas-to-gas heat exchanger 410 by a heat exchange between the circulating off-gas stream 30, having a temperature of about 165° C. as noted above, and the discharged or off-gas stream 56 from the fluid bed sorbent cooler 52 having a temperature of about 450° C. as noted above. The temperature of the heated and circulating off-gas stream 30 carrying the removed $NO_x$ is further increased in the gas-to-gas heat exchanger 420 by a gas-to-gas heat exchange with the off-gas 450 from the $NO_x$ reduction burner 430 which has a temperature of about 1100° C. The further heated circulating off-gas stream 30 is then fed into the fluid bed heater 18 to supply the stream of hot air 20 which removes or desorbs the $NO_x$ from the saturated NOXSO Sorbent entering the fluid bed heater 18 from the fluid bed adsorber 14.

In the embodiment of FIG. 4, the pressure measuring apparatus 234 and valve 236 maintain the gas volume of the heated circulating off-gas stream 30 carrying the removed $NO_x$ constant, or substantially constant, by periodically extracting or bleeding off a volume of such gas and by feeding such bled off or extracted gas into the $NO_x$ reduction burner 230, as indicated by the arrows 451, 452 and 453, where the $NO_x$ is destroyed or reduced to harmless $N_2$, $H_2O$ and $CO_2$ which may be vented to the atmosphere as indicated by the arrow 455.

In summary, it will be understood that, in the specific embodiments of the present invention, the improved NOXSO Process and the improved apparatus for practicing the NOXSO Process shown in FIGS. 2–4 and described above, are transparent to the power plant producing the flue gas 12 and overcome the disadvantages of the prior art NOXSO Process described in the Background of the Invention and illustrated in FIG. 1.

It will be understood by those skilled in the art that many modifications and variations may be made in the present invention without departing from the spirit and the scope thereof.

What is claimed is:

1. In a process using sorbent to adsorb and remove at least $NO_x$ from a gas, wherein the sorbent having the $NO_x$ adsorbed thereto is heated by heated air to remove the $NO_x$ from the sorbent and produce an off-gas stream of heated air carrying the $NO_x$ removed from the sorbent, WHEREIN THE IMPROVEMENT COMPRISES:
   recirculating the off-gas stream over a continuous flow of sorbent saturated with $NO_x$ to increase the concentration of $NO_x$ in said off-gas stream of heated air and feeding said off-gas stream of heated air having said increased concentration of $NO_x$ therein into an $NO_x$ reduction apparatus to reduce said $NO_x$, or into a by-product recovery apparatus to generate a nitrogen by-product.

2. The process according to claim 1 wherein said step of increasing the concentration of $NO_x$ in said off-gas stream of heated air is the step of circulating said off-gas stream of heated air around a closed loop comprising a sorbent heater and a gas heater, said loop extending from the production of the off-gas stream of heated air, through said gas heater, through said sorbent heater and ending at said production of the off-gas stream of heated air to produce a circulating off-gas stream of heated air and adding additional $NO_x$ removed from additional sorbent to said circulating off-gas stream of heated air and extracting from said circulating off-gas stream of heated air a volume of gas at least equal to the volume of said additional removed $NO_x$ added to said circulating off-gas stream of heated air.

3. The process according to claim 1 wherein said heated air used to remove said $NO_x$ from said sorbent is produced by the combustion of fuel which also produces combustion products which continuously enter said off-gas stream of heated air, and wherein said step of increasing the concentration of $NO_x$ in said off-gas stream is the step of circulating said off-gas stream of heated air around a loop to produce a circulating off-gas stream of heated air and simultaneously adding additional $NO_x$ removed from additional sorbent to said circulating off-gas stream of heated air and extracting from said circulating off-gas stream of heated air a volume of gas at least equal to the sum of the volume of said additional $NO_x$ added to said loop and said combustion products.

4. The process according to claim 2 or 3 wherein said extracting step includes the steps of establishing a pressure range for said circulating off-gas stream of heated air related to the volume of gas of said circulating off-gas stream to be maintained in said loop, measuring the pressure in said circulating off-gas stream of heated air and bleeding off said circulating off-gas stream of heated air to said $NO_x$ reduction apparatus or to nitrogen by-product producing apparatus upon the measured pressure being above said range and at least reducing the bleeding off of said circulating off-gas stream to said $NO_x$ reduction apparatus, or to nitrogen by-product recovery apparatus, upon the measured pressure being below said pressure range to maintain the pressure of said circulating off-gas stream of heated air within said pressure range and thereby to maintain the gas volume of said circulating off-gas stream of heated air substantially constant.

5. In a process using sorbent to adsorb and remove at least $NO_x$ from a gas, wherein the sorbent having the $NO_x$ adsorbed thereto is heated in a sorbent heater by heated air from a hot air source to remove the $NO_x$ from the sorbent and produce a first off-gas stream of heated air carrying the $NO_x$ removed from the sorbent, and wherein the heated sorbent having said $NO_x$ removed therefrom is cooled in a sorbent cooler which produces a second off-gas stream of heated air, wherein said second off-gas stream of heated air is hotter than said first off-gas stream of heated air, WHEREIN THE IMPROVEMENT COMPRISES:
   recirculating the off-gas stream over a continuous flow of sorbent saturated with $NO_x$ to increase the concentration of $NO_x$ in said first off-gas stream of heated air and feeding the off-gas stream of heated air having said increased concentration of $NO_x$ therein into a $NO_x$ reduction apparatus to reduce said $NO_x$ or into a nitrogen by-product producing apparatus; and
   producing a gas-to-gas heat exchange between said first and second off-gas streams of heated air to raise the temperature of said first off-gas stream of heated air to produce a further heated first off-gas stream of heated air and using said further heated first off-gas stream of heated air to provide at least in part said heated air used to remove said $NO_x$ from said sorbent and to reduce the amount of energy required to remove said $NO_x$ from said sorbent.

6. The process according to claim 5 wherein said step of increasing the concentration of $NO_x$ in said first off-gas stream of heated air is the step of circulating said first off-gas stream of heated air around a loop comprising a sorbent heater and a gas heater, said loop extending from the production of the off-gas stream of heated air, through said gas heater, through said sorbent heater and ending at said production of the off-gas stream of heated air to produce a circulating first off-gas stream of heated air and simultaneously adding to said circulating first off-gas stream of heated air additional $NO_x$ removed from additional sorbent entering said sorbent heater and extracting from said circulating first off-gas stream of heated air a volume of gas at least equal to the volume of said additional $NO_x$.

7. The process according to claim 5 wherein said hot air source is a hot air heater which burns fuel in the presence of combustion air to produce said heated air for removing said $NO_x$ from said sorbent and which hot air heater also produces combustion products which continuously enter said heated air, and wherein said step of increasing the concentration of $NO_x$ in said first off-gas stream of heated air is the step of circulating said first off-gas stream of heated air around a closed loop comprising a sorbent heater and a gas heater, said loop extending from the production of the off-gas stream of heated air, through said gas heater, through said sorbent heater and ending at said production of the off-gas stream of heated air which includes at least said sorbent heater and simultaneously adding to said circulating first off-gas stream of heated air additional $NO_x$ removed from additional sorbent and extracting from said circulating first off-gas stream of heated air a volume of gas at least equal to the volume of said additional $NO_x$ and said combustion products.

8. The process according to claim 6 or 7 wherein said extracting step includes the steps of establishing a pressure range for said circulating first off-gas stream of heated air related to the volume of gas of said circulating first off-gas stream to be maintained in said loop, measuring the pressure in said circulating first off-gas stream of heated air and bleeding off said circulating first off-gas stream of heated air to reduce the pressure in said circulating first off-gas stream upon the measured pressure being above said range and reducing the bleeding off of said circulating first off-gas stream of heated air to allow the pressure in said circulating first off-gas stream of heated air to increase upon the measured pressure being below said predetermined range to maintain the pressure of said first circulating off-gas stream of heated air within said pressure range.

9. The process according to claim 8 wherein said step of bleeding off said circulating first off-gas stream of heated air to reduce the pressure therein is the step of bleeding off said first off-gas stream of heated air to said $NO_x$ reduction apparatus or to nitrogen by-product producing apparatus.

10. The process according to claim 5 wherein said hot air source is a hot air heater which burns fuel in the presence of combustion air and wherein said step of using said further heated first off-gas stream of air to produce at least in part said heated air used to remove said $NO_x$ from said sorbent is the step of conducting said further heated first off-gas stream of heated air to said hot air heater to supply at least a portion of said heated air used to remove said $NO_x$ from said sorbent and to reduce the amount of said fuel required to be burned in said hot air heater to heat said heated air used to remove said $NO_x$ from said sorbent.

11. The process according to claim 5 wherein said process utilizes a third off-gas stream of heated air from a $NO_x$ reducing burner which burns fuel to produce said third off-gas stream of heated air, and wherein said process includes the further step of producing a gas-to-gas heat exchange between said further heated first off-gas stream of heated air and said third off-gas stream of heated air to further raise the temperature of said further heated first off-gas stream of heated air to provide a still further heated first off-gas stream of heated air and using said still further heated first off-gas stream of heated air to provide said heated air used to remove said $NO_x$ from said sorbent thereby reducing the amount of energy required to remove said $NO_x$ from said sorbent.

12. In a process using sorbent to adsorb and remove at least $NO_x$ from a gas, wherein the sorbent having the $NO_x$ adsorbed thereto is heated in a sorbent heater by heated air from a hot air source to remove the $NO_x$ from the sorbent and produce an off-gas stream of heated air carrying the $NO_x$ removed from the sorbent, and wherein the heated sorbent having said $NO_x$ removed therefrom is cooled by cooled air in a sorbent cooler which produces a second off-gas stream of heated air, and wherein a hot air source which burns fuel is used to produce said heated air used to remove said $NO_x$ from said sorbent and which hot air source also produces combustion products which continuously enter said heated air, WHEREIN THE IMPROVEMENT COMPRISES:
recirculating the off-gas stream over a continuous flow of sorbent saturated with $NO_x$ to increase the concentration of $NO_x$ in said first off-gas stream of heated air and feeding the off-gas stream of heated air having said increased concentration of $NO_x$ therein into a $NO_x$ reduction apparatus to reduce said $NO_x$ or into a nitrogen by-product producing apparatus.

13. The process according to claim 12 wherein said step of increasing the concentration of $NO_x$ in said off-gas stream of heated air is the step of circulating said off-gas stream of heated air around a closed loop including said sorbent heater and said sorbent cooler, said loop extending from said production of the off-gas stream of heated air, through said sorbent cooler, through said sorbent heater and ending at said production of the off-gas stream of heated air to produce a circulating off-gas stream of heated air and simultaneously adding to said circulating off-gas stream of heated air additional $NO_x$ removed from additional sorbent entering said sorbent heater and at extracting from said first off-gas stream of heated air a volume of gas at least equal to the volume of said additional $NO_x$ and said combustion products.

14. The process according to claim 13 wherein said circulating first off-gas stream of heated air is passed through a gas cooler to reduce the temperature of a portion of said circulating first off-gas stream of heated air to produce a stream of air of reduced temperature and wherein said stream of air of reduced temperature is fed into said sorbent cooler to provide said cooled air for cooling said heated sorbent.

15. In a process wherein sorbent is used to adsorb and remove at least $NO_x$ from a gas and wherein the sorbent comprises alkali-impregnated alumina particles and wherein the sorbent having the $NO_x$ adsorbed thereto is heated to remove the $NO_x$ from the sorbent and to produce an off-gas stream of heated air carrying the $NO_x$ removed from the sorbent, WHEREIN THE IMPROVEMENT COMPRISES:
increasing the concentration of $NO_x$ in said off-gas stream of heated air, by recirculating the off-gas stream over a continuous flow of sorbent saturated with $NO_x$ feeding the off-gas stream of heated air having said increased concentration of $NO_x$ therein into a $NO_x$ reduction apparatus to reduce said $NO_x$ and maintaining the gas volume of the off-gas stream of heated air having said increased concentration of $NO_x$ therein substantially constant as the concentration of $NO_x$ is being increased in said off-gas stream.

16. In a process which uses sorbent to adsorb and remove at least $NO_x$ from a gas, wherein the sorbent comprises alkali-treated alumina particles and wherein the sorbent having the $NO_x$ adsorbed thereto is heated in a sorbent heater by heated air from a hot air source to remove the $NO_x$ form the sorbent and produce a first off-stream of heated air carrying the $NO_x$ removed from the sorbent, and wherein the heated sorbent having said $NO_x$ removed therefrom is cooled in a sorbent cooler which produces a second off-gas stream of heated air, wherein said second off-gas stream of heated air is hotter than said first off-gas stream of heated air,

WHEREIN THE IMPROVEMENT COMPRISES:

recirculating the off-gas stream over a continuous flow of sorbent saturated with $NO_x$ to increase the concentration of $NO_x$ in said first off-gas stream of heated air, feeding the off-gas stream of heated air having said increased concentration of $NO_x$ therein into a $NO_x$ reduction apparatus to reduce said $NO_x$ or into a nitrogen by-product producing apparatus to generate a nitrogen by-product, and maintaining the gas volume of the off-gas stream of heated air having said increased concentration of $NO_x$ therein substantially constant as the concentration of $NO_x$ is being increased in said off-gas stream; and producing a gas-to-gas heat exchange between said first and said second off-gas streams of heated air to raise the temperature of said first off-gas stream of heated air to produce a further heated first off-gas stream of heated air and using said further heated first off-gas stream of heated air to provide at least in part said heated air used to remove said $NO_x$ from said sorbent and to reduce the amount of energy required to remove said $NO_x$ from said sorbent.

* * * * *